Figure 1:
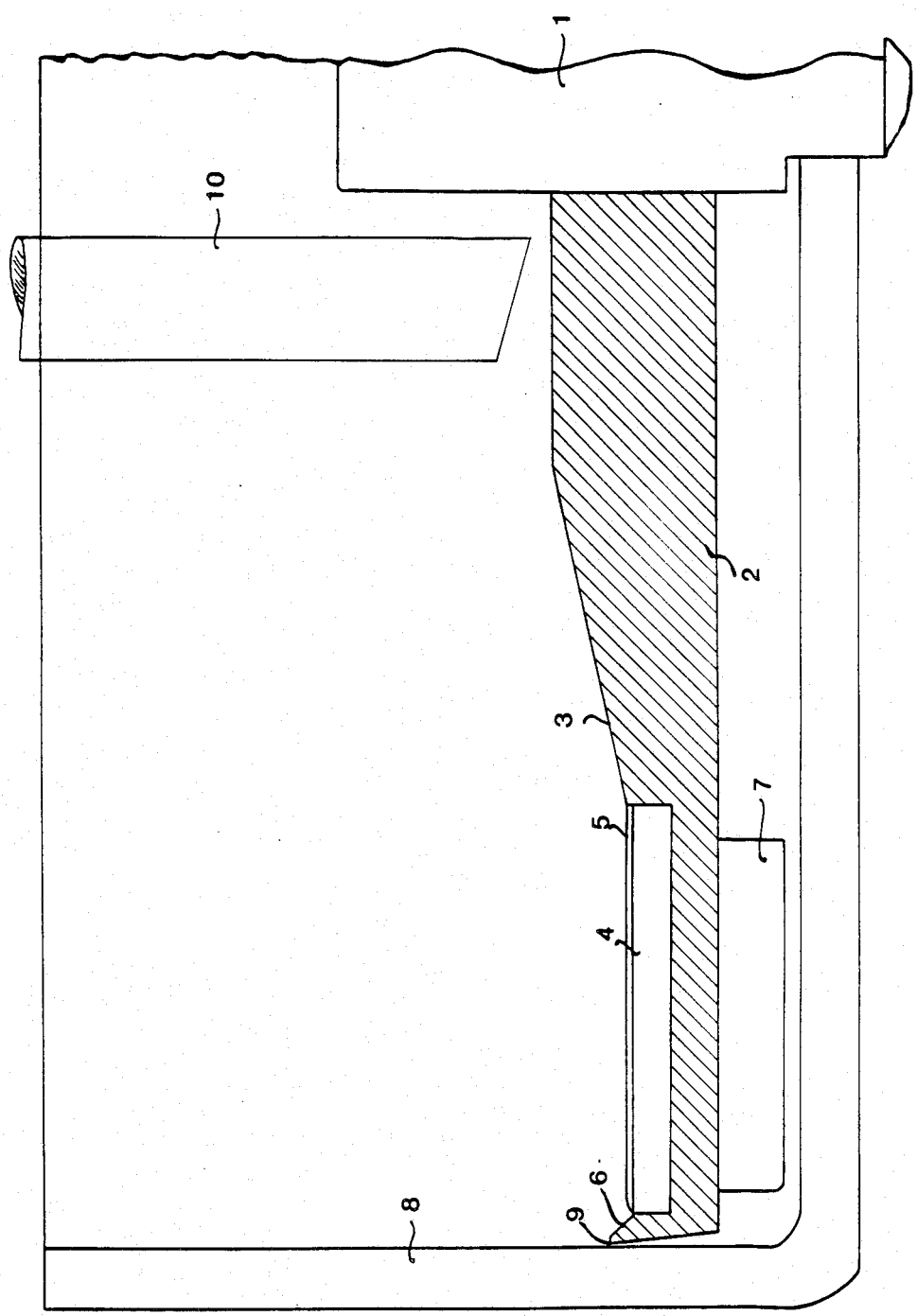

United States Patent [19]

Appelgren et al.

[11] Patent Number: 4,636,163

[45] Date of Patent: Jan. 13, 1987

[54] APPARATUS FOR FORMING MATERIAL INTO A BALL

[75] Inventors: Curt H. Appelgren, Kungsbacka; Nemo Ivarsson, Enskede, both of Sweden

[73] Assignee: Lejus Medical Aktiebolag, Molndal, Sweden

[21] Appl. No.: 799,980

[22] Filed: Nov. 20, 1985

[30] Foreign Application Priority Data

Nov. 20, 1984 [SE] Sweden ............................... 8405839

[51] Int. Cl.$^4$ ....................... A21C 11/00; B29C 43/00
[52] U.S. Cl. ..................................... 425/332; 425/403
[58] Field of Search ................................ 425/332, 333

[56] References Cited

U.S. PATENT DOCUMENTS

| | | | |
|---|---|---|---|
| 776,731 | 12/1904 | Dietz | 425/332 |
| 786,042 | 3/1905 | Loncaric | 425/332 |
| 1,570,339 | 1/1926 | Dilley | 425/339 |
| 1,575,283 | 3/1926 | Schiff | 425/332 |
| 3,277,520 | 10/1966 | Nakahara | 425/332 |

Primary Examiner—Willard E. Hoag
Attorney, Agent, or Firm—Burns, Doane, Swecker & Mathis

[57] ABSTRACT

A device for shaping a semi-moist material into spheres without substantially disintegrating and pulverizing the material, whereby a disc (2) is rotatably arranged in the horizontal plane, which disc (2) on its upper side is arranged to receive a material to be shaped, and thereby is provided with a waffle patterned surface (4), and on its under side is provided with at least two wings (7) arranged substantially radially to the rotational axis of the disc (2), and substantially perpendicular to the under side of the disc (2); that the disc on its upper side, at its periphery has an annular, smooth surface (6), and that the disc (2) is arranged to be rotated against a cylindrical wall (8), whereby between said disc (2) and said wall (8) there is provided an annular slot (9) for allowing the passage of air.

3 Claims, 2 Drawing Figures

APPARATUS FOR FORMING MATERIAL INTO A BALL

TECHNICAL FIELD

The present invention relates to a device for shaping a semi-moist material into spheres, pills, without substantially disintegrating and pulverizing the material, whereby it comprises a disc being rotatably arranged substantially in the horizontal plane, which disc on its upper side is arranged to receive a material to be shaped, and thereby is provided with a waffle patterned surface.

The object of the present invention is to obtain a device by means of which one can shape spheres, pills, without simultaneously obtaining a disintegration into particles and powder of the material to be shaped.

BACKGROUND OF THE INVENTION

When shaping spheres, pills, of a granulated or extruded material, the material is rolled in varying rotating directions. The material is hereby a semi-moist granulate or extrudate, i.e., in the latter case it is a semi-moist material which has been pressed through a matrix (screen) for obtaining cylindrical rods with a length greater than the diameter. Generally, however, a greater number of collisions and squeezings are obtained during the process so that a great part of the material is crushed and forms particles or powder, which gives a direct efficiency loss.

Moreover, in many cases it is impossible to reuse the material, and thus this has to be disposed. This means a further loss, which, e.g., in the production of pharmaceuticals, can be very high due to high price of the active compound and/or of the inert ingredients.

DE-B-1 667 038 discloses a spheronizer which comprises a disc being rotatably arranged in the horizontal plane, whereby the disc on its upper side is provided with a waffle patterned surface. However, this does not eliminate the production of particles and powder, and thereby losses.

DESCRIPTION OF THE PRESENT INVENTION

It has now been shown possible to be able to eliminate these problems by means of the present invention, which is characterized in that the disc on its upper side is provided with at least two wings arranged substantially radially to the rotational axis of the disc, and substantially perpendicular from the under side of the disc; that the disc on its upper side at its periphery has an annular smooth surface, and that the disc is arranged to be rotated against a cylindrical wall, whereby between said disc and said wall there is provided an annular slot through which air can pass.

Further characteristics are evident from the accompanying claims.

Figure 2:
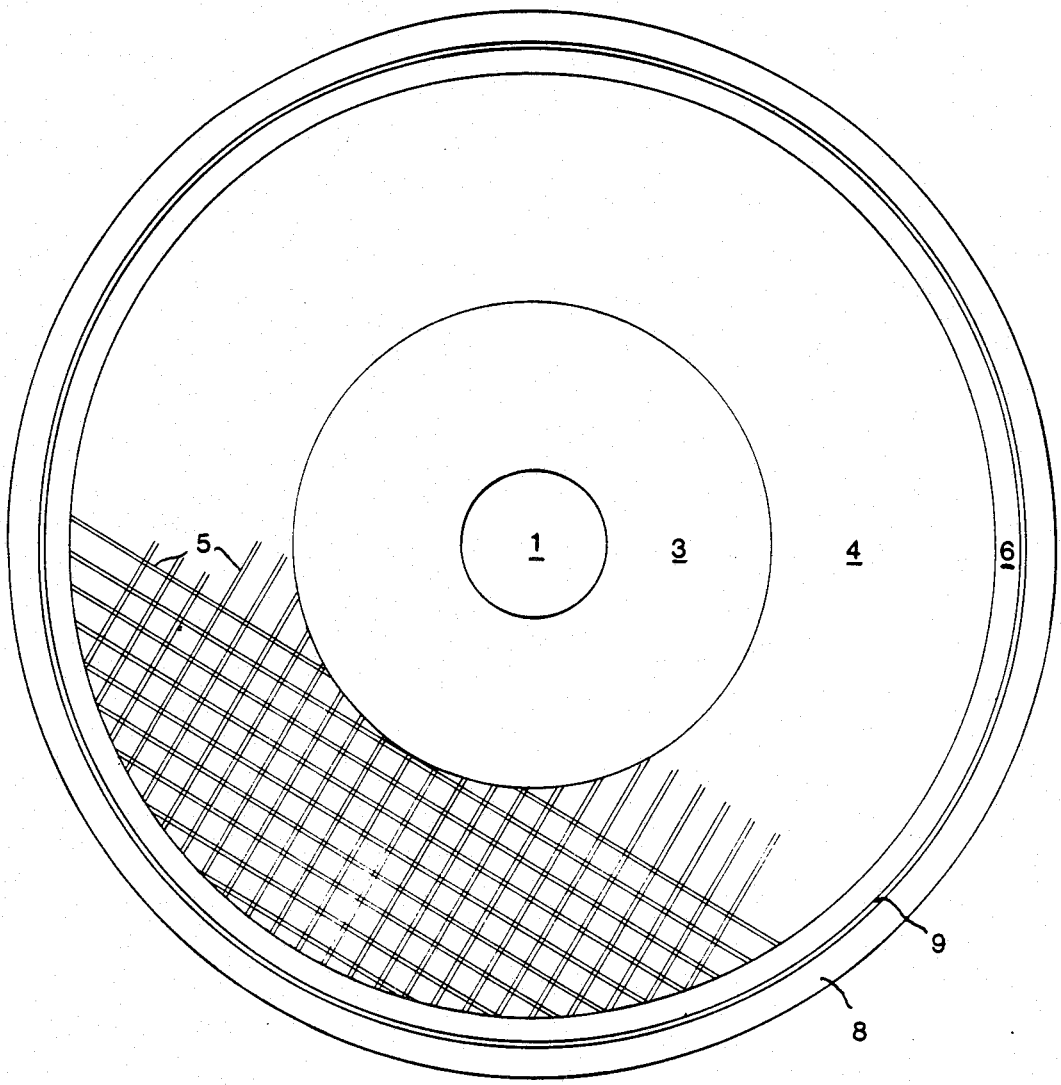

The invention will be described more in detail in the following with reference to the attached drawing, wherein FIG. 1 shows a vertical cross-section through an embodiment of the invention, half the width of the device being shown;

FIG. 2 shows the embodiment of FIG. 1 in full seen from above.

1 denotes a central shaft, which is rotatably attached to a motor (not shown) for rotating said shaft. A circular disc 2 is attached to said shaft 1, which disc 2 on its upper side encompasses three parts, viz. an inner circular ring 3, which slopes outwardly-downwardly towards an intermediate ring 4, which is provided with crossing U-shaped tracks 5. The tracks 5 can be V-shaped, but the U-shape is preferred. The tracks 5 form a so called waffle pattern. The depth of the tracks can vary and is normally 0.5 to 2 mm, as well as its width, but this is normally about 1 mm. The distance between the tracks 5 is 5–10 mm. The intermediate ring 4 slopes outwardly-downwardly but to a less extent than the inner ring 3. The sloping angle of the former is 2°–3°, which for the latter can be up to 15°. The intermediate ring 4 can be completely planar as well, which in many cases have shown to be preferred. Right out on the disc 2 there is an outer ring 6, which is smooth and which, preferably, slopes outwardly-upwardly. The rings 3, and 4 can be removably attached for cleansing purposes, but can also be an integral part of the disc 2. On the under side of the disc 2, relatively close to its periphery, at least two wings 7 are arranged. The wings 7 are equally distributed on the under side of the disc. The wings 7 are arranged substantially perpendicular to the under side of the disc and substantially radial to its centre. The wings 7 can be obliquely placed in both said planes in order to increase its fan effect.

The disc 2 is further arranged in a cylindrical drum 8, in immediate vicinity of its inner wall, whereby there is an annular slot 9 present between the disc 2 and the wall 8.

For introducing a material a feeding tube 10 is schematically shown. This can have any design suitable for the feeding of the material in question, and is not essential to the function of the device per se. Feeding shall, however, take place relatively centrally.

For the feeding out of material there is an opening (not shown) arranged in the cylindrical wall.

The device functions so that an extruded, semi-moist material, such as a pharmaceutical composition is fed at the centre of the device onto the upper side of the disc 2. Due to the centrifugal force at the rotation of the disc the material is moved outwardly and meets the waffle patterned surface 4. Due to the patterns the rotational directions of the material veers round all the time, whereby the material is shaped into spheres. This is, as said, semi-moist, and thereby plastic. During this reshaping the material is simultaneously transported towards the periphery of the disc 2. Close to the periphery on the smooth surface 6 the material meets with a light air stream produced by the wings 7 on the under side of the disc 2, which air stream efficiently prevents the material from being squeezed and broken in the slot, simultaneously as it lifts off the material from the cylindrical wall 8 and gently tumbles it. It is not a question of a real fluidizing effect, but the air stream protects the material from being disintegrated, particularly as it now has become somewhat drier.

We claim:

1. A device for shaping a semi-moist material into spheres without substantially disintegrating and pulverizing the material comprising:
   (a) a disc which is rotatable substantially in the horizontal plane and which has an upper side which is arranged to receive the semi-moist material, said upper side of the disc further comprising a waffle patterned surface and an annular smooth surface at the periphery of the disc;
   (b) at least two wings on an under side of the disc, said wings being arranged substantially radial to the rotational axis of the disc and substantially perpendicular to the under side of the disc; and (c) a cylindrical wall surrounding the disc whereby an annular slot is formed beneath the annular smooth surface of the disc and the cylindrical wall to allow passage of air flow.

2. The device of claim 1 wherein the waffle patterned surface is formed by a plurality of U-shaped tracks placed substantially perpendicular to each other.

3. The device of claim 1 wherein the annular smooth surface slopes outwardly-upwardly.

* * * * *